Jan. 21, 1930. E. J. SCHREMP Re. 17,570

PRESSING MACHINE FOR GARMENTS AND THE LIKE

Original Filed June 4, 1924 2 Sheets-Sheet 1

Inventor
Edward J. Schremp

Attorneys
Bohleber & Ledbetter

PRESSING MACHINE FOR GARMENTS AND THE LIKE

Original Filed June 4, 1924 2 Sheets-Sheet 2

Inventor
Edward J. Schremp
Attorney
Bohleber & Ledbetter

Reissued Jan. 21, 1930 Re. 17,570

UNITED STATES PATENT OFFICE

EDWARD J. SCHREMP, OF BEECHHURST, NEW YORK, ASSIGNOR TO THE PROSPERITY COMPANY, INC., OF SYRACUSE, NEW YORK, A CORPORATION OF NEW YORK

PRESSING MACHINE FOR GARMENTS AND THE LIKE

Original No. 1,631,770, dated June 7, 1927, Serial No. 717,704, filed June 4, 1924. Application for reissue filed June 6, 1929. Serial No. 368,995.

This invention relates to improvements in machines for the ironing or pressing of garments and fabrics, of the power-press type, and has for its purpose to produce a machine of this type which will operate in an improved manner particularly with reference to the delivery of the goods into position to be operated upon whereby the feeding of the machine is materially facilitated with a resulting desirable increase in output.

Important features of the present invention, which contribute to the rapidity and ease of operation, consist of an improved arrangement employing double sliding trays operatively connected and supported to be moved alternately into and out of pressing position and further in the provision of means actuated by the movement of the trays into pressing position and operating automatically to control the operating force for the pressing head whereby the latter will be depressed to perform the pressing operation.

My improved construction accordingly provides the desirable arrangement whereby the movement of the respective work supporting trays into position for pressing will automatically operate to control the pressing mechanism without requiring other and special manipulation to effect the lowering of the pressing head. The operation of the machine is accordingly materially simplified and the capacity of the machine correspondingly increased.

To allow of the operation in the manner as described, the operating connections arranged to be actuated by the trays, are of a construction and arrangement to permit of the independent manipulation of the power controlling means whereby the pressure control may be released or reversed by manual or other operation when the pressing of the garments is completed.

The described and other features and advantages of my present improvements will be more fully understood by reference to the accompanying drawings wherein like reference characters are applied to the corresponding parts in the several views.

Referring to the drawings.

Figures 1, 4:
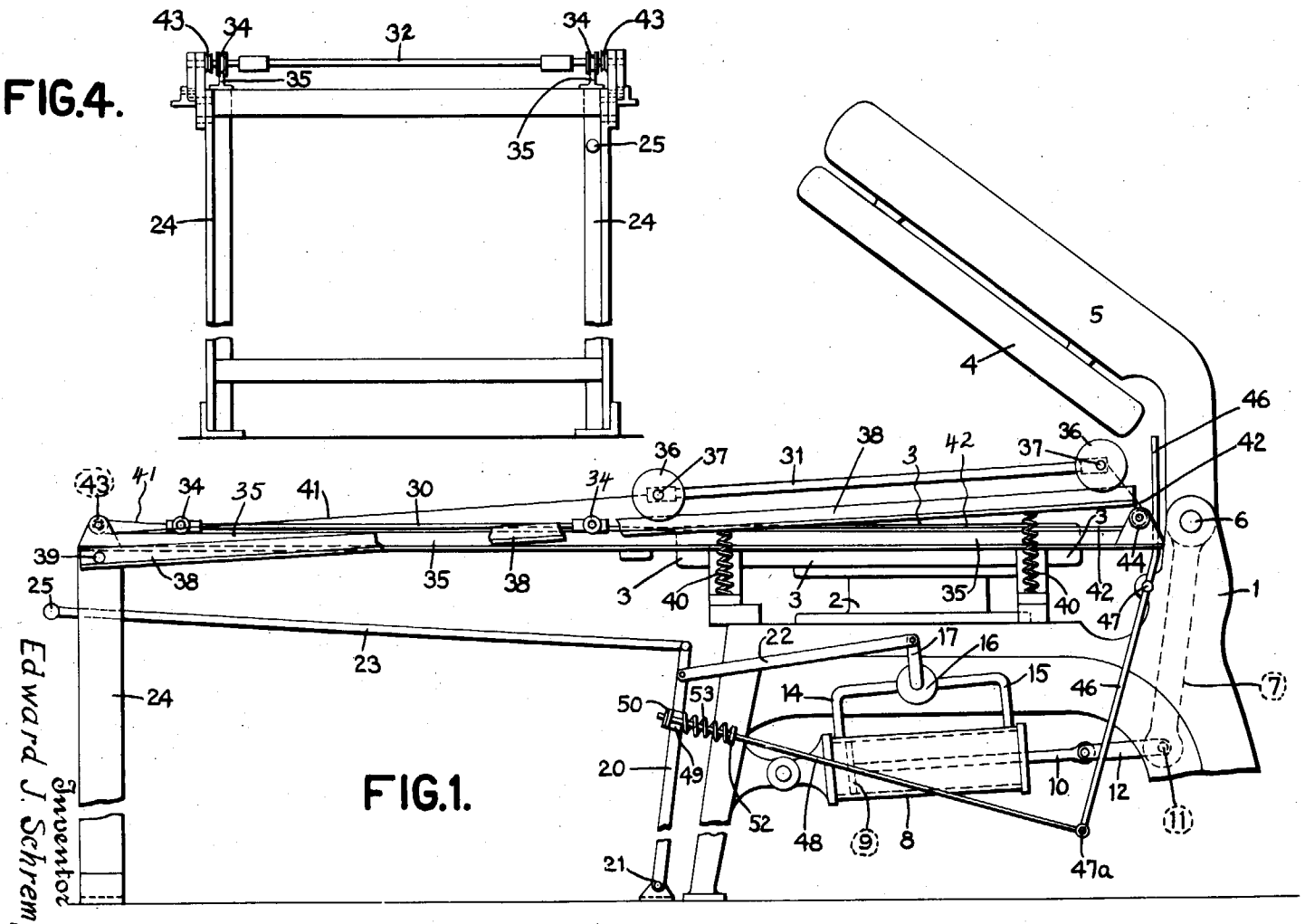
Fig. 1 is a view of a pressing machine embodying the features of my invention and shown in side elevation.
Fig. 4 is a front end elevation of the track supporting bracket.
Figure 2:
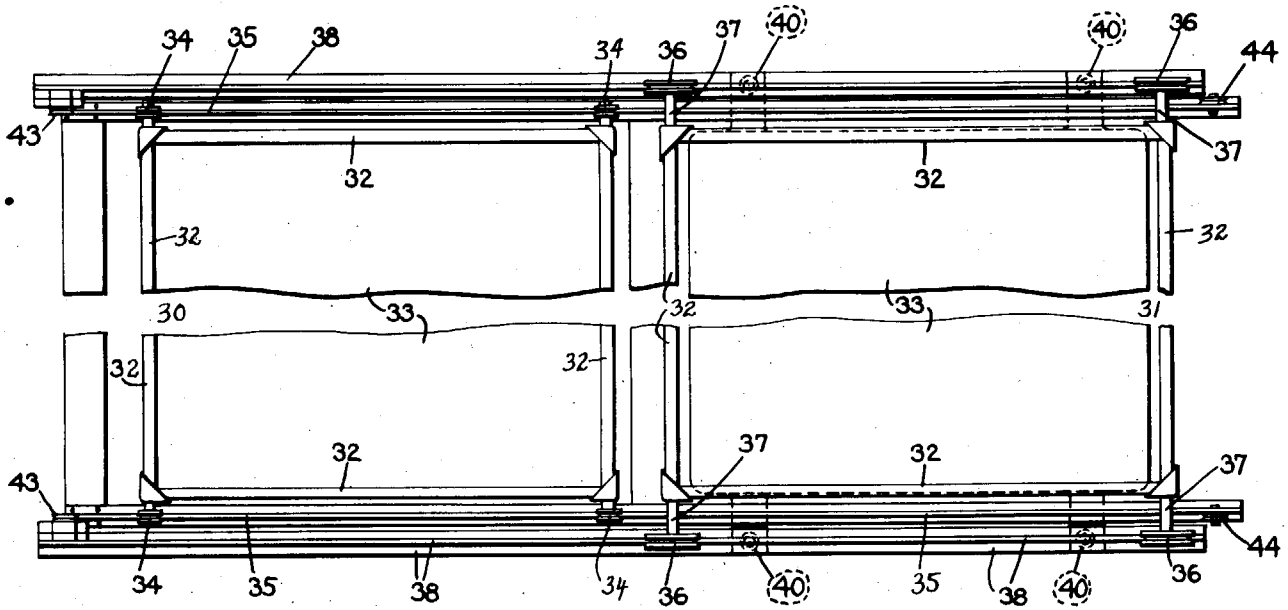
Fig. 2 is a plan view thereof with the pressing head omitted.
Figure 3:
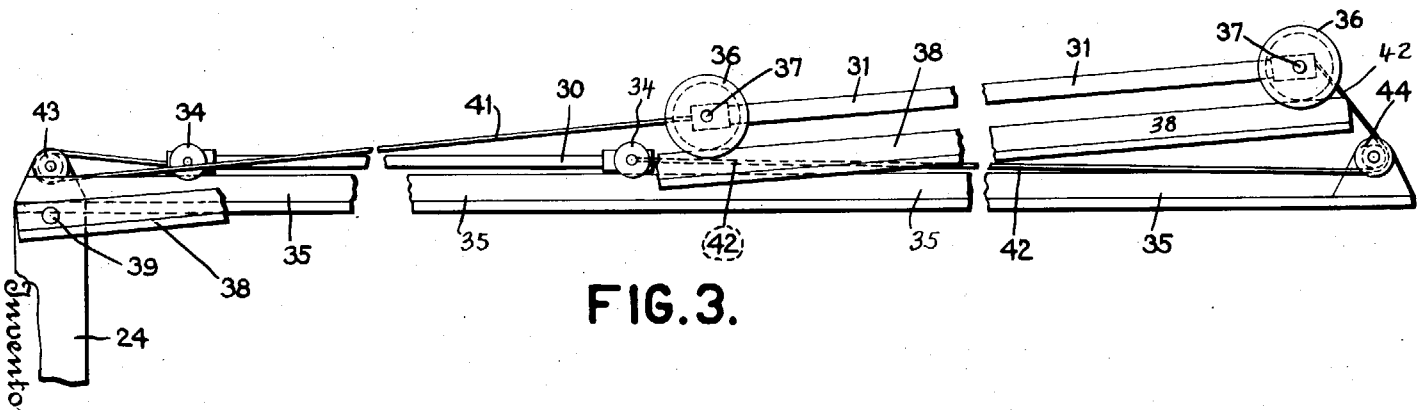
Fig. 3 is a view in side elevation showing the improved arrangement of the delivery trays and supporting tracks therefor.

In the approved construction as herein illustrated, the improved features of my invention are illustrated incorporated or associated with a power type of pressing machine employing steam as the operating force for the pressing head. The pressing machine, as shown, comprises a suitable supporting frame or standard 1 having mounted thereon the usual rigid or stationary support 2 for the stationary buck or pressing member 3. For cooperating with the fixed pressing member or buck there is provided a movable pressing head 4 mounted upon a supporting pressure arm 5 journalled at 6 upon the standard 1 and provided with a depending operating arm or extension 7 formed integrally with the arm 5.

The pressure arm 5 is operated by a steam cylinder 8 provided with a piston 9 and piston rod 10 pivotally connected at 11 to the pressure lever 7. The piston rod 10 is shown as provided with an articulated member 12 to compensate for the arc of movement of the pivotal connection 11. As will be readily understood, by admitting steam within the cylinder 8 to one side or the other of the piston it will accomplish the movement of the latter for depressing the pressure head upon the buck or stationary pressing member 3 or will move the pressing head 4 into the elevated or open position, as shown in Fig. 1.

The steam is admitted within the cylinder for this purpose through the intakes 14 and 15 from a supply pipe under the control of a two-way valve 16 having an operating lever 17. For manually actuating the control valve 16 suitable operating connections are provided which, as shown, consist of a vertical lever arm 20 pivotally supported at 21 and pivotally connected by a link 22 to the valve arm 17 and an operating link 23 pivotally connected to the upper end of the lever 20 and extending forwardly through a sliding bearing in the supporting bracket 24 and provided with an externally positioned handle 25 for manual operation.

In accordance with the present invention a double sliding tray structure is provided for the purpose of receiving garments or articles to be pressed and for moving them into position super-imposed above the stationary pressing board or buck 3 in the desirable arrangement whereby the delivery trays are supported and connected to be moved reversely so as to be alternately in pressing position and in an outer position for the removal of the finished article and for receiving thereon another garment to be pressed. This arrangement is particularly advantageous in that it allows the operations of taking off the finished article and positioning of a new article upon one tray being performed during the period of pressing as related to the other of the trays.

The respective trays are indicated at 30 and 31 and are each composed of rectangular frames 32 to which is attached a panel 33 of canvas or other suitable flexible material adapted for receiving the garments and to flexibly support them between the pressing members 3 and 4, which as will be understood are desirably of flexible construction and suitably heated for properly pressing or ironing of the goods. Each of the trays is provided with rollers operating upon suitable tracks to guide the travelling movement thereof. As shown the tray 30 is provided with rollers 34 suitably journalled upon shaft extensions at each corner thereof, the rollers 34 being grooved and fitted to ride upon oppositely positioned tracks 35 supported upon brackets or frame supports 24 and at their rearward ends upon the frame of the pressing machine.

The other and uppermost tray 31 is similarly provided with four supporting rollers 36 journalled upon suitable lateral extending axles 37, the rollers being grooved and fitted to ride upon oppositely positioned movable tracks 38. The tracks 38 are pivotally supported at 39 at their forward ends upon the legs 24 and at their rearward end portions are supported upon the compression springs 40 operating normally to elevate the tracks. The respective trays are connected to be moved in unison by means of oppositely positioned and similarly arranged cables 41 and 42 connected to the respective trays and passed over forward and rearward pulleys 43 and 44 journalled upon suitable bearings mounted upon the frame members 24 and the frame 1.

The described arrangement provides that the trays shall be movable reversely in unison, the tray 30 which is the lower tray, being movable upon the fixed tracks 35 which are positioned at the proper height to be movable over the buck 3 of the pressing machine in close proximity and operating relation thereto. The upper tray 31 is movable in a path above that of the tray 30 whereby the latter passes thereunder and when the upper tray 31 is in pressing position above the buck 3, upon lowering of the pressing head 4 the upper tray 31 will be depressed together with its supporting tracks against the influence of the springs 40 during the pressing of the garment.

In further accordance with the present invention it is provided that the pressing head shall be automatically lowered as the trays are successively brought into operating or pressing position. For this purpose suitable valve operating connections are provided and arranged to be actuated by engagement therewith of the trays, or of parts movably connected therewith, when the trays are moved into the position for pressing or in superimposed relation to the stationary buck 3. The connections as here illustrated comprise a bell crank lever 46 suitably fulcrumed at 47 upon the standard 1, the upper arm of said lever being extended into the path of the trays to be engaged thereby during the final period of their movement and the lower arm of the bell lever 46 being pivotally connected at 47[a] to a connecting link 48 connected to the lever 20.

To allow for the independent and manual operation of the steam controlled valve 16 for the release of the pressure and raising of the pressing head the connection between the connecting link 48 and the lever 20 is of a resilient or yielding character which allows of the operating link 23 being shifted rearwardly for reversing the steam without movement of the actuating lever 46 which, as will be noted, is held from reverse movement until the tray is retracted. The resilient connection provided consists of the arrangement whereby the forward end of the link connection 48 is passed freely through an eye of a bracket 49 attached to the lever 20 and provided with a retaining nut 50 upon its outer end.

The link 48 has affixed thereon a bearing collar 52 and a coil spring 53 is fitted upon the connecting link or rod 48 interposed between the bearing collar 52 and the bracket 49. The construction thus provided allows of the manually operating connections being shifted to reverse the valve 16 against the influence of and by the compression of the spring 53 and accordingly independent of the movement of the automatically actuated connections 46 and 48.

As will be understood from the foregoing and the operation of the machine, the operator arranges the articles to be pressed upon the outwardly positioned tray during the period that the pressing is being performed upon the other tray then advanced within the pressing machine proper. Upon completion of the pressing operation the operator presses the handle 25 inwardly or to the right as illustrated in Fig. 1, thereby reversing the steam pressure to elevate the pressing head. Upon then manually shifting or sliding the trays the unpressed garment is advanced to the pressing machine and the finished garment upon its tray retracted and during the final interval of the tray movement the advancing tray will actuate the lever 46 so as automatically to effect the reversal of the steam and depressing of the pressure head.

While I have illustrated an approved embodiment of the features of my invention it will be understood that various modifications may be made therein without departing from the scope of the invention as defined in the appended claims.

Having described my invention I claim:

1. An ironing or pressing machine for garments and the like having in combination with the buck and the pressing head movable with relation thereto: a power means connected to the head for operating the same, a controlling means connected with the power means operative to control the movement of the power means, a work supporting tray slidable on guides for movement into and out of operative relation with the buck and pressing head, and actuating connections for the controlling means in the path of movement of the tray arranged to be actuated upon the movement of the tray into operating or pressing position to effect the lowering of the pressing head and said actuating connections being provided with means to permit the controlling means being actuated independently thereof.

2. An ironing and pressing machine for garments and the like having in combination with the buck and the pressing head movable with relation thereto: a power means connected to the head for operating the same, controlling means connected with the power means operative to control the movement of the power means, a work supporting tray slidable on guides for movement into and out of pressing position, an actuating connection for the controlling means comprising a lever positioned to be engaged by the tray when moved into pressing position and connections from said lever to the controlling means including a yieldable element adapted to permit the controlling means being moved independently of the actuating lever and independent actuating means connected to the controlling means.

3. A ironing and pressing machine for garments and the like having in combination with the buck and the pressing head movable with relation thereto: work supporting trays slidable on guides for movement into and out of position alternately between the head and buck and connected with each other so that movement of one tray in one direction will cause movement of the other tray in an opposite direction, stationary tracks supported to guide the movement of one of the trays into pressing position beneath the head and tracks for guiding the movement of the other tray, said latter tracks being resiliently supported to be movable to support its tray to normally pass above the other tray and to permit its tray being depressed when moved beneath the head into pressing position.

4. An ironing and pressing machine for garments and the like having in combination with the buck and the pressing head movable with relation thereto: work supporting trays slidable on guides for movement into and out of position alternately between the head and buck and connected with each other so that movement of one tray in one direction will cause movement of the other tray in an opposite direction, stationary tracks supported to guide the movement of one of the trays into pressing position beneath the head and said tracks being pivotally supported at their forward ends and resiliently supported at their inward ends thereby to be movable to support its tray to normally pass above the other tray and permit of its tray being depressed by engagement therewith of the pressing head.

5. In a garment or ironing press having cooperating press jaws, power means connected to one of the jaws for closing the same, controlling means connected with the power means operative to control the movement of the power means, a work supporting tray slidable on guides for movement into and out of pressing position between the press jaws, and actuating connections for the controlling means in the path of movement of the tray arranged to be actuated upon the movement of the tray into pressing position aforesaid to automatically effect the closing of the press.

6. In a garment or ironing press, coacting press jaws, power means connected with one of the jaws for moving the same to open and close the press, controlling means connected with the power means operative to control the movement thereof, a work carrying tray travelling on guides for movement into and out of pressing position between the press jaws, actuating connections for the controlling means in the path of movement of the tray arranged to be automatically actuated upon the movement of the tray into pressing position as aforesaid to automatically effect the closing of the press jaws, and said actuating connections being provided with means to permit the controlling means being actuated independently of the actuating connections.

7. In a garment or laundry press, coacting press jaws, power means for opening and closing the press jaws, automatically operated controlling means connected with the power means operative to control the movement of the power means, a work carrying tray travelling on guides for movement into and out of pressing position between the jaws, an actuating connection for the automatically operated controlling means comprising a lever positioned to be engaged by the tray when moved into pressing position, and connections from said lever extending to the automatically operated controlling means including a yieldable element adapted to permit said automatically operated controlling means being moved independently of the actuating lever.

8. In a garment or laundry press, coacting press jaws, power means for opening and closing the press jaws, automatically operated controlling means connected with the power means operative to control the movement of the power means, a work carrying tray travelling on guides for movement into and out of pressing position between the jaws, an actuating connection for the automatically operated controlling means comprising a lever positioned to be engaged by the tray when moved into pressing position, and connections from said lever extending to the automatically operated controlling means including a yieldable element adapted to permit said automatically operated controlling means being moved independently of the actuating lever, and manually operated controlling means connected to the automatically operated controlling means whereby the power means may be controlled manually by an operator independently of the lever.

9. A garment or ironing press and the like having in combination with coacting press jaws, work carrying trays movable into and out of pressing position alternately between the press jaws and connected with each other so that movement of one tray in one direction will cause movement of the other tray in an opposite direction, stationary tracks supported to guide the movement of one of the trays into pressing position between the jaws, and tracks for guiding the movement of the other tray, said latter tracks having resilient supporting means to support its tray to normally pass above the other tray and to permit its tray being depressed when moved into the pressing jaws so as to obtain jaw compression on the resiliently supported press jaw.

10. An ironing and pressing machine for garments and the like having in combination with coacting press jaws, operating means to work one of the jaws to open and close the press, work trays slidable on guides for movement into and out of pressing position alternately between the coacting jaws, means connecting the trays together so that movement of one tray in one direction will cause movement of the other tray in an opposite direction, stationary tracks supported to guide the movement of one of the trays into pressing position, and tracks for guiding the movement of the other tray, said latter tracks having resilient supports movable to support its tray to normally pass above the other tray and to permit its tray being depressed when moved into the press jaws.

11. An ironing and pressing machine for garments and the like having in combination with the pressing buck and the pressing head movable in relation thereto, work supporting trays slidable on guides for movement into and out of position alternately between the head and buck, means connecting one tray with the other so that movement of one tray in one direction will cause movement of the other tray in an opposite direction, stationary tracks supported to guide the movement of one of the trays into pressing position beneath the head and said tracks being pivotally supported at their forward ends and resiliently supported at their inward ends, thereby to be movable to support its tray to normally pass above the other tray and also movable to permit of its tray being depressed by engagement therewith of the press head, and both tracks directed toward the jaws from the front of the press, each tray movable on its track and crossing over the other whereby when one tray is in the jaws the other is out of the coacting jaws.

12. An ironing or garment press and the like having in combination with the pressing buck and a pressing head movable with relation thereto in a pressing machine: guides and work supporting trays slidable on the guides for movement into and out of position alternately between the head and buck, means connecting the trays with each other so that movement of one tray in one direction will cause movement of the other tray in an opposite direction, one of the guides comprising a trackway supported to guide the movement of one of the trays into pressing position beneath the head, another of the guides comprising a second trackway and having pivotal supporting means at the forward end thereof, resilient supporting means at the other end thereof to movably support its tray to normally pass above the other tray and permit of its tray being depressed by engagement therewith by the pressing head, motor means connected with the pressing head, and automatic control means in the path of both trays and engageable thereby to control the operation of the motor means.

In testimony whereof I have signed this specification.

EDWARD J. SCHREMP.